(12) United States Patent
Zheng

(10) Patent No.: US 11,999,402 B2
(45) Date of Patent: Jun. 4, 2024

(54) STORAGE ASSEMBLY AND CHILD CARRIER THEREWITH

(71) Applicant: China Wonderland Nurserygoods Co., Ltd., Guangdong (CN)

(72) Inventor: Leilei Zheng, Guangdong (CN)

(73) Assignee: CHINA WONDERLAND NURSERYGOODS CO., LTD., Guangdong (CN)

(*) Notice: Subject to any disclaimer, the term of this patent is extended or adjusted under 35 U.S.C. 154(b) by 0 days.

(21) Appl. No.: 17/355,187

(22) Filed: Jun. 23, 2021

(65) Prior Publication Data
US 2021/0403072 A1 Dec. 30, 2021

(30) Foreign Application Priority Data
Jun. 30, 2020 (CN) .......................... 202021249467.7

(51) Int. Cl.
B62B 9/12 (2006.01)
B62B 9/26 (2006.01)

(52) U.S. Cl.
CPC ............ B62B 9/12 (2013.01); B62B 9/26 (2013.01); B62B 2202/023 (2013.01)

(58) Field of Classification Search
CPC . B62B 9/26; B62B 2202/023; Y10S 224/926; B60N 3/103; A47G 23/0225; A45F 2005/026
See application file for complete search history.

(56) References Cited

U.S. PATENT DOCUMENTS 3,734,439 A * 5/1973 Wintz ............... A47G 23/0241 248/230.8
4,419,794 A 12/1983 Horton, Jr.
(Continued)

FOREIGN PATENT DOCUMENTS

GB 2528723 A 2/2016
NL 2011208 A 3/2014
(Continued)

OTHER PUBLICATIONS https://www.youtube.com/watch?v=j5l3eCn4SI8;"New! Evenflo Pivot travel System Review"; by "growingyourbaby"; published Jul. 23, 2017; especially pertinant frames: 7:54 and 8:58.*

Primary Examiner — Emma K Frick
(74) Attorney, Agent, or Firm — CANTOR COLBURN LLP

(57) ABSTRACT

A storage assembly is installed on a frame of a child carrier. The storage assembly includes a storage component, a fixing base and a connecting component rotatably connected to the fixing base. One of the fixing base and the connecting component is fixedly connected to a handle of the frame, and the other of the fixing base and the connecting component is fixedly to the storage component. The storage component can be assembled on or disassembled from the handle through the fixing base and the connecting component. The storage component can rotate relative to the frame by relative rotation between the connecting component and the fixing base, so as to avoid interference with folding operation of the frame due to the storage component when folding the frame, and further facilitate folding operation of the child carrier, so that the child carrier can be folded to ideal volume for easy carrying.

18 Claims, 6 Drawing Sheets

(56) References Cited

U.S. PATENT DOCUMENTS

| | | | | |
|---|---|---|---|---|
| 4,697,780 | A * | 10/1987 | Wenkman | F16M 11/041 248/314 |
| 5,086,958 | A * | 2/1992 | Nagy | B60R 11/00 224/570 |
| 5,320,263 | A * | 6/1994 | Kobylack | A63B 55/408 224/558 |
| 5,464,183 | A * | 11/1995 | McConnell | B62B 9/26 224/407 |
| 5,620,120 | A * | 4/1997 | Tien | H04M 1/04 224/904 |
| 5,622,296 | A * | 4/1997 | Pirhonen | A45F 5/02 248/225.11 |
| 5,799,847 | A * | 9/1998 | Sandor | A45F 5/02 224/904 |
| 6,390,427 | B1 * | 5/2002 | McConnell | B60N 3/107 248/228.3 |
| 6,935,652 | B2 * | 8/2005 | Fair | B62B 7/08 280/658 |
| 6,942,131 | B2 * | 9/2005 | Trautman | B62J 11/04 224/547 |
| 7,543,841 | B2 * | 6/2009 | Dotsey | B60B 33/0039 280/657 |
| 8,033,518 | B2 * | 10/2011 | Schuchman | B60N 3/103 224/679 |
| 8,353,432 | B2 * | 1/2013 | Liu | B62B 9/26 403/93 |
| 8,807,862 | B2 * | 8/2014 | Zeng | B62B 9/26 403/93 |
| 9,302,695 | B2 * | 4/2016 | Hartenstine | B62B 7/10 |
| 9,399,479 | B1 * | 7/2016 | Chen | F16M 13/022 |
| 9,950,731 | B2 * | 4/2018 | Kim | F16B 2/12 |
| 10,307,006 | B2 * | 6/2019 | Knoll | B67B 7/16 |
| 10,588,812 | B2 * | 3/2020 | Brockway | A61H 3/00 |
| D923,520 | S * | 6/2021 | Zheng | D12/129 |
| 11,160,355 | B2 * | 11/2021 | Martinez | B60N 3/101 |
| 11,885,361 | B2 * | 1/2024 | Wu | H04N 23/57 |
| 2010/0259021 | A1 | 10/2010 | Ahnert | |
| 2010/0276909 | A1 | 11/2010 | Liu | |
| 2011/0298198 | A1 * | 12/2011 | Minato | B62B 7/06 280/648 |
| 2015/0291201 | A1 | 10/2015 | Hartenstine | |

FOREIGN PATENT DOCUMENTS

| | | |
|---|---|---|
| TW | 201038430 A1 | 11/2010 |
| TW | 1538837 B | 6/2016 |

* cited by examiner

STORAGE ASSEMBLY AND CHILD CARRIER THEREWITH

BACKGROUND OF THE INVENTION

1. Field of the Invention

The present invention relates to a storage assembly and a child carrier therewith, and more particularly, to a rotatable storage assembly and a child carrier with simple structure and convenient assembly and disassembly.

2. Description of the Prior Art

With continuous development of the economy and continuous advancement of science and technology, a child carrier is one of many consumer products and specially designed for children. For parents with children, when they take their children out for shopping or walking, they usually use the child carrier with wheels instead of hand carrying to reduce the burden on adults, and the child carrier also has a comfortable and safe ride, so that the child carrier becomes more and more popular. The existing child carrier is often equipped with a storage component for storing small objects. The storage component is generally fixed on a handle of a frame of the conventional child carrier. Since the storage component is fixed, it often interferes with the folding operation of the frame, so that the entire frame cannot be folded to the most compact state. In addition, since the fixing structure for fixing the storage component on the frame is complicated, it is inconvenient to disassemble the storage component, which affects the use effect of the child carrier. Therefore, there is an urgent need for developing a storage component and a child carrier with simple structure and convenient assembly and disassembly for overcoming the above-mentioned problems.

SUMMARY OF THE INVENTION

Therefore, an objective of the present invention is to provide a rotatable storage assembly and a child carrier with simple structure and convenient assembly and disassembly, for solving the aforementioned problems.

In order to achieve the aforementioned objective, the present invention discloses a storage assembly installed on a frame of a child carrier. The storage assembly includes a storage component, a fixing base and a connecting component rotatably connected to the fixing base. One of the fixing base and the connecting component is fixedly connected to a handle of the frame, and the other of the fixing base and the connecting component is fixedly to the storage component.

Preferably, the fixing base is fixedly connected to the handle of the frame, an end of the connecting component is connected to the storage component, another end of the connecting component is detachably pivoted to the fixing base, and the storage component pivots relative to the fixing base when folding or unfolding the frame.

Preferably, the storage component pivots between a using state and a folding state, the storage component is at the using state when axes of the storage component and the handle are intersected to form an included angle, and the storage component is at the folding state when the axes of the storage component and the handle are parallel with each other.

Preferably, the included angle is 45°.

Preferably, the connecting component and the fixing base are slidably connected, an upper end of the connecting component contacts against an upper end of the fixing base, and a lower end of the connecting component does not contact against or does not completely contact against a lower end of the fixing base.

Preferably, an engaging portion is formed on one of the fixing base and the connecting component, and a connecting portion is formed on the other of the fixing base and the connecting component for slidably engaging with the engaging portion.

Preferably, an upper end of the engaging portion is wider than a lower end of the engaging portion, and upper and lower ends of the connecting portion and the upper end of the engaging portion have equal widths.

Preferably, the engaging portion and the connecting portion are two conical structures with different conical degrees and sleeved with each other.

Preferably, the connecting portion is sleeved on the engaging portion along a direction from an upper end of the engaging portion toward a lower end of the engaging portion.

Preferably, the connecting portion is sleeved on the engaging portion along a direction perpendicular to the engaging portion.

Preferably, the engaging portion is disposed on the fixing base along a longitudinal direction of the fixing base, the connecting portion is disposed on the connecting component along a longitudinal direction of the connecting component, and an upper end of the connection portion and an upper end of the engaging portion are formed in arc shapes.

Preferably, the fixing base includes a base and an engaging portion protruding from the base and formed in a boss structure.

Preferably, the connecting component includes a bottom wall and a U-shaped lateral wall extending from an edge of the bottom wall in a direction away from the bottom wall, and a slot-shaped connecting portion is enclosed by the bottom wall and the U-shaped lateral wall.

Preferably, a guiding slot is formed on the connecting component, and a top end of the U-shaped lateral wall is bent inwardly along a direction parallel to the bottom wall so as to form a U-shaped top wall with the guiding slot.

Preferably, the connecting component further includes at least one positioning protrusion extending from a lateral side of the U-shaped top wall toward the guiding slot.

Preferably, the connecting component further includes at least one protruding rib disposed on the bottom wall and arranged along a longitudinal direction of the bottom wall, and the at least one protruding rib is formed in an arc shape and configured to contact against an engaging portion of the fixing base.

In order to achieve the aforementioned objective, the present invention further discloses a child carrier including a frame having a front leg, a rear leg, and a handle pivotally connected to the front leg and the rear leg. The child carrier includes a seat body connected to the frame, a front wheel assembly connected to the front leg, a rear wheel assembly connected to the rear leg, and a storage assembly rotatably installed on the handle. The storage assembly includes a storage component, a fixing base and a connecting component rotatably connected to the fixing base. One of the fixing base and the connecting component is fixedly connected to a handle of the frame, and the other of the fixing base and the connecting component is fixedly to the storage component In summary, the storage assembly is installed on the frame of the child carrier and includes the storage component, the fixing base, and the connecting component rotatably connected to the fixing base. One of the fixing base and the connecting component is fixedly connected to the handle of the frame, and the other of the fixing base and the connecting component is fixedly to the storage component. The storage assembly has simple structure, and the storage component can be assembled on or disassembled from the handle through the fixing base and the connecting component, which is convenient for installation. The storage component can rotate relative to the handle by relative rotation between the connecting component and the fixing base, so as to effectively avoid interference with the folding operation of the frame due to the storage component when folding the frame, and further facilitate the folding operation of the frame, so that the child carrier can be folded to ideal volume for easy carrying and storage, which enhances convenience of using the child carrier with the storage assembly.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
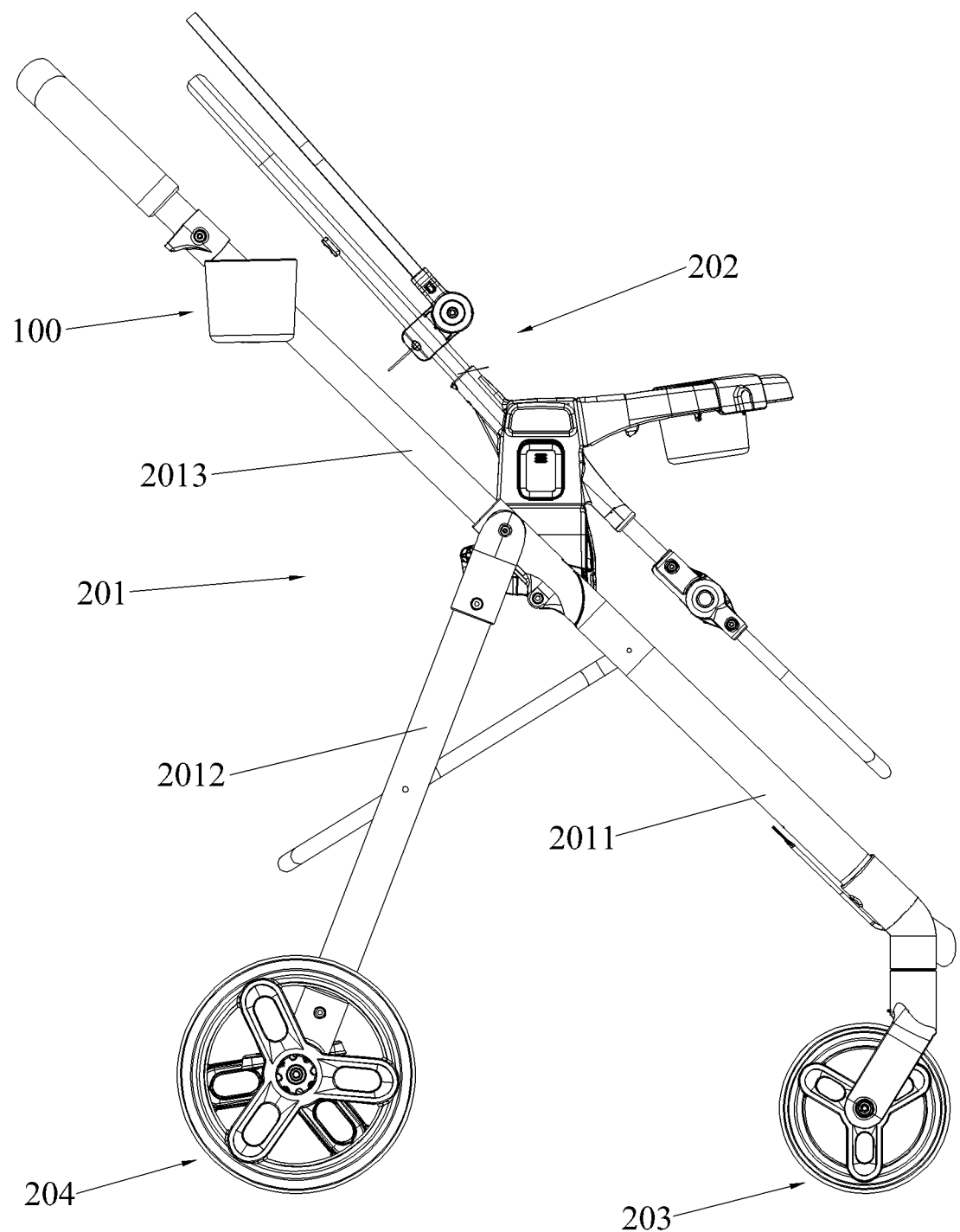
FIG. 1 is a schematic drawing of a child carrier of the present application.

Please refer to FIG. 1. FIG. 1 is a schematic drawing of a child carrier 200 of the present application. The child carrier 200 can be a stroller, but it is not limited thereto. The child carrier 200 includes a frame 201 and a seat body 202 connected to the frame 201. The frame 201 includes a front leg 2011, a rear leg 2012 and a handle 2013. The handle 2013 is pivotally connected to the front leg 2011 and the rear leg 2012. The child carrier 200 further includes a front wheel assembly 203 connected to the front leg 2011 of the frame 201, a rear wheel assembly 204 connected to the rear leg 2012 of the frame 201, and a storage assembly 100. The storage assembly 100 is assembled on the frame 201. Specifically, the storage assembly 100 can be rotatably installed on the handle 2013. The storage assembly 100 can rotate relative to the frame 201, so as to effectively avoid interference due to the storage assembly 100 when the frame is folded or unfolded, which facilitates folding and unfolding operations of the frame 201 of the child carrier 200.

Figure 2:
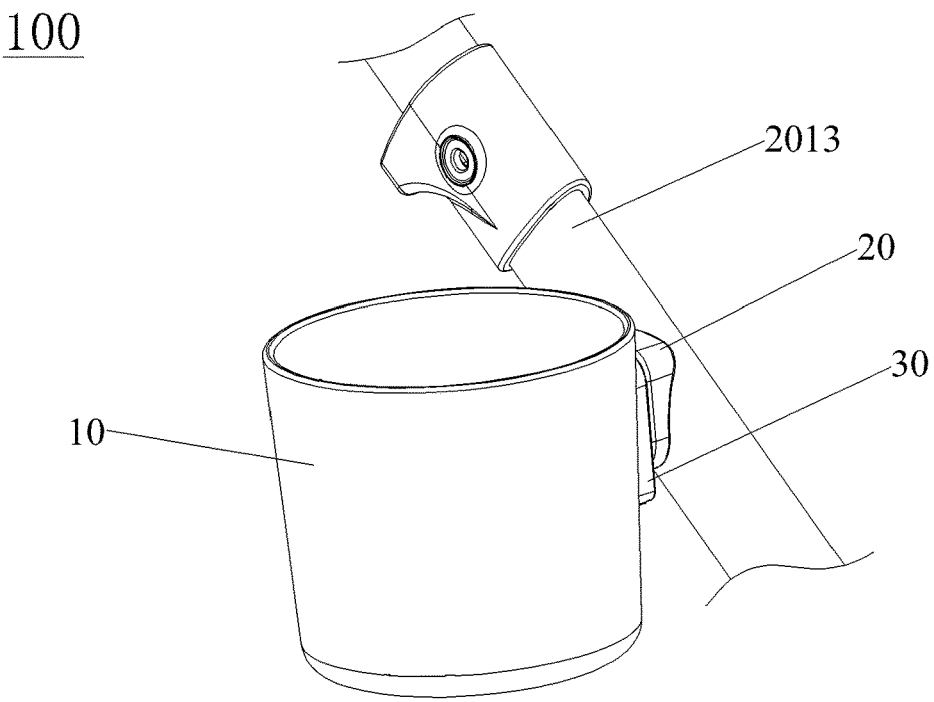
FIG. 2 and FIG. 3 are diagrams of a storage assembly assembled on a handle of the present application.
Figure 3:
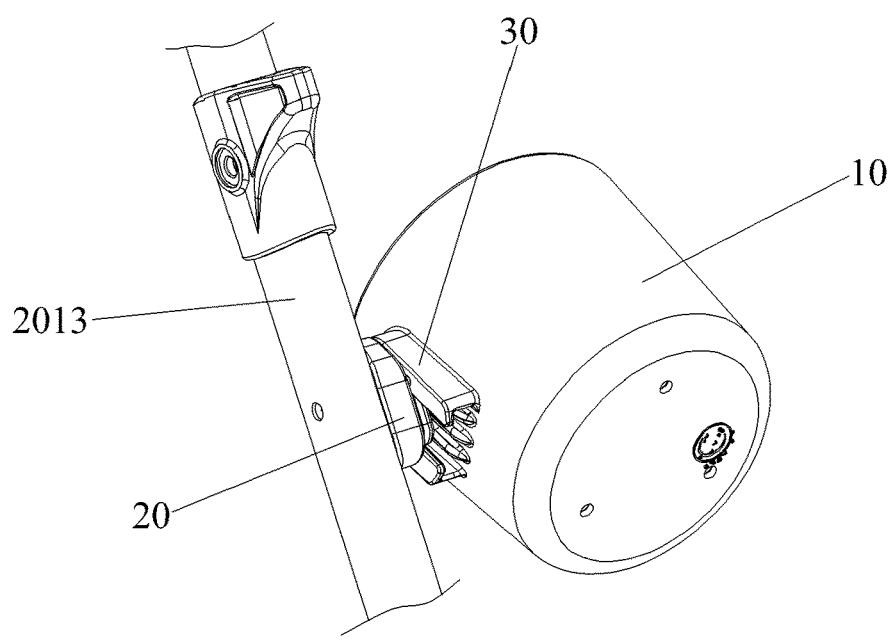

Please refer to FIG. 2 and FIG. 3. FIG. 2 and FIG. 3 are diagrams of the storage assembly 100 assembled on the handle 2013 of the present application. The storage assembly 100 includes a storage component 10, a fixing base 20, and a connecting component 30 rotatably connected to the fixing base 20. One of the fixing base 20 and the connecting component 30 is fixedly connected to the handle 2013 of the frame 201, and the other of the fixing base 20 and the connecting component 30 is fixedly to the storage component 10.

Specifically, the storage component 10 can be a cup-shaped, box-shaped or cylindrical structure, and the storage component 10 has a holding space for storing small objects. The fixing base 20 is fixed on the handle 2013, an end of the connecting component 30 is connected to the storage component 10, another end of the connecting component 30 is detachably pivoted to the fixing base 20, and the storage component 10 can pivot relative to the fixing base 20 through the connecting component 30 when folding or unfolding the frame 201, so that the storage component 10 can rotate relative to the handle 2013 and the frame 201 can be folded more smoothly. The connecting component 30 and the fixing base 20 can be detachably connected, which makes assembly and disassembly between the storage component 10 and the handle 2013 more convenient and enhances convenience of using the child carrier 200 with the storage assembly 100. In other embodiments, the connecting component 30 also can be fixed on the handle 2013, and the fixing base 20 can be fixed on the storage component 10 and detachably pivoted to the connecting component 30.

Specifically, the connecting component 30 and the fixing base 20 can be slidably connected, an upper end of the connecting component 30 can always contact against an upper end of the fixing base 20, and a lower end of the connecting component 30 does not contact against or does not completely contact against a lower end of the fixing base 20, so that the lower end of the connecting component 30 can rotate around the contact point between the upper end of the connecting component 30 and the upper end of the fixing base 20. Preferably, the connecting component 30 and the storage component 10 can be an integral structure, thereby simplifying the structure and facilitating manufacture and assembly. Alternatively, the connecting component 30 also can be an independent component and fixed to an outer wall of the storage component 10 in a clamping, socketing, screwing or welding manner.

Figure 4:
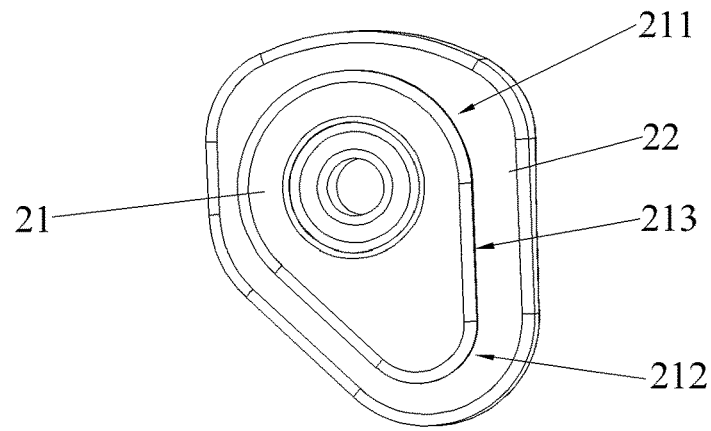
FIG. 4 is a diagram of a fixing base of the present application.
Figure 5:
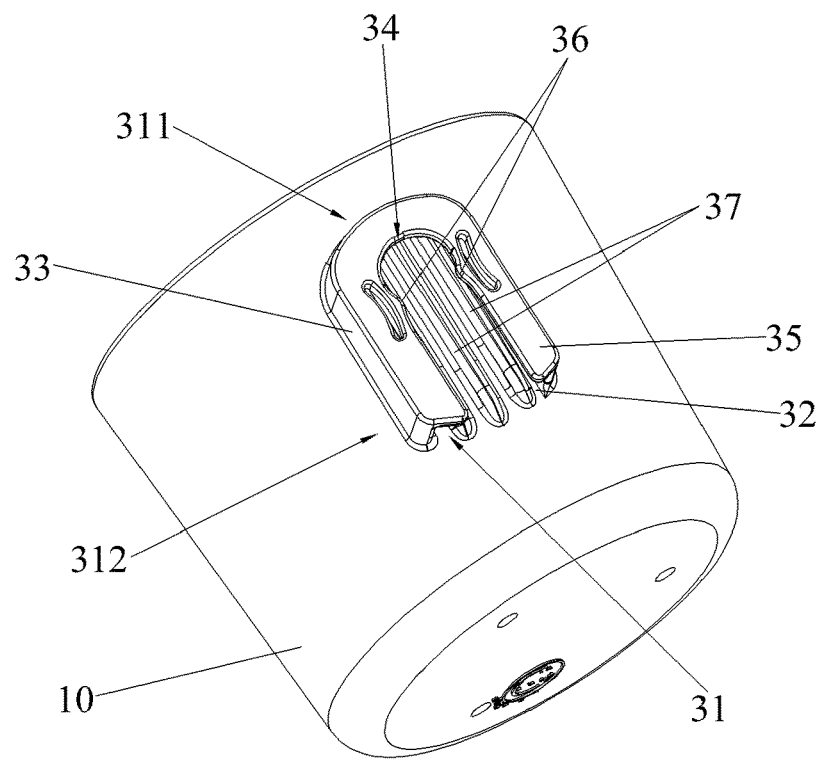
FIG. 5 is a diagram of a connecting component of the present application.

Please refer to FIG. 4 and FIG. 5. FIG. 4 is a diagram of the fixing base 20 of the present application. FIG. 5 is a diagram of the connecting component 30 of the present application. An engaging portion 21 is formed on one of the fixing base 20 and the connecting component 30, and a connecting portion 31 is formed on the other of the fixing base 20 and the connecting component 30 for slidably engaging with the engaging portion 21. An upper end 211 of the engaging portion 21 is wider than a lower end 212 of the engaging portion 21. A width of an upper end 311 of the connecting portion 31 is substantially equal to a width of a lower end 312 of the connecting portion 31 and corresponding to a width of the upper end 211 of the engaging portion 21. That is, the upper end 311 of the connecting portion 31, the lower end 312 of the connecting portion 31, and the upper end 211 of the engaging portion 21 can have equal widths, so as to achieve relative rotation between the fixing base 20 and the connecting component 30. Alternatively, the engaging portion 21 and the connecting portion 31 can be two conical structures with different conical degrees and sleeved with each other. The upper end 211 of the engaging portion 21 is wider than the lower end 212 of the engaging portion 21, so that the engaging portion 21 has a certain conical degree. The upper end 311 of the connecting portion 31 is wider than the lower end 312 of the connecting portion 31, so that the connecting portion 31 has a certain conical degree. The conical degree of the connecting portion 31 is less than the conical degree of the engaging portion 21, which also can achieve relative rotation between the fixing base 20 and the connecting component 30.

Specifically, the connecting portion 31 can be sleeved on the engaging portion 21 along a direction from the upper end 211 of the engaging portion 21 toward the lower end 212 of the engaging portion 21 until the upper end 311 of the connecting 31 contacts against the upper end 211 of the engaging portion 21. Alternatively, the connecting portion 31 also can be sleeved on the engaging portion 21 along a direction perpendicular to the engaging portion 21, so that the upper end 311 of the connecting 31 can contact against the upper end 211 of the engaging portion 21.

Please refer to FIG. 4 and FIG. 5. The engaging portion 21 is disposed on the fixing base 20 along a longitudinal direction of the fixing base 20, the connecting portion 31 is disposed on the connecting component 30 along a longitudinal direction of the connecting component 30, and the upper end 311 of the connection portion 31 and the upper end 211 of the engaging portion 21 are formed in arc shapes, so as to facilitate the relative rotation between the fixing base 20 and the connecting component 30. Specifically, the engaging portion can be formed in U-shaped, trapezoidal, wedge-shaped, dovetail-shaped or splay-shaped structure, and the connecting portion 31 can be formed in a U-shaped structure. Preferably, the engaging portion 21 can be in a block shape, and the connecting portion 31 can be in a slot shape, but it is not limited to thereto. In this embodiment, a lateral wall of the slot-shaped connecting portion 31 can be flat and smooth. Correspondingly, an outer edge of the block-shaped engaging portion 21 can also be flat and smooth, and the connection between the fixing base 20 and the connecting component 30 can be conveniently and effectively achieved through the insertion of the engaging portion 21 and the connecting component 31.

Specifically, the fixing base 20 includes a base 22 and the engaging portion 21 protruding from the base 22 and formed in a boss structure. The upper end 211 of the engaging portion 21 is wider than the lower end 212 of the engaging portion 21, so that the engaging portion 21 formed in the boss structure has a certain conical degree. Correspondingly, the connecting portion 31 can be a slot structure, so that the engaging portion 21 formed in the boss structure can be inserted into the slot-shaped connecting portion 31 and the connecting portion 31 can rotate relative to the engaging portion 21. Preferably, the base 22 and the engaging portion 21 can be an integral structure, thereby facilitating manufacture. The fixing base 20 can be clamped, socketed, screwed or welded to the handle 2013 through the base 22.

Please refer to FIG. 4 and FIG. 5. The connecting component 31 includes a bottom wall 32 and a U-shaped lateral wall 33 extending from an edge of the bottom wall 32 in a direction away from the bottom wall 32, and the slot-shaped connecting portion 31 is enclosed by the bottom wall 32 and the U-shaped lateral wall 33. A guiding slot 34 is formed on the connecting component 30, and a top end of the U-shaped lateral wall 33 is bent inwardly along a direction parallel to the bottom wall 32 so as to form a U-shaped top wall 35 with the guiding slot 34. Specifically, a height of the U-shaped lateral wall 33 corresponds to a height of the engaging portion 21 formed in the boss structure, and a width of the U-shaped top wall 35 corresponds to a distance between an edge of the engaging portion 21 and an edge of the base 22. The engaging portion 21 formed in the boss structure can be inserted into the slot-shaped connecting portion 31 from an insertion opening on a lower side of the connecting portion 31. The engaging portion 21 can slide in the slot-shaped connecting portion 31 until the upper end 211 of the engaging portion 21 and the upper end 311 of the connecting portion 31 contact against each other, and the U-shaped top wall 35 can slide on the base 22 so that the guiding slot 34 engages with the junction of the engaging portion 21 and the base 22, thereby providing guiding and restraining functions.

Preferably, the connecting component 30 further includes at least one positioning protrusion 36 extending from an inner lateral side of the U-shaped top wall 35 toward the guiding slot 34, so as to strengthen the connection. Furthermore, the connecting component 30 further includes at least one protruding rib 37 disposed on the bottom wall 32 and arranged along a longitudinal direction of the bottom wall 32, and the protruding rib 37 is formed in an arc shape and configured to contact against the engaging portion 21, so as to prevent detachment of the connecting portion 31 and the engaging portion 21 which are engaged with each other.

Figure 6:
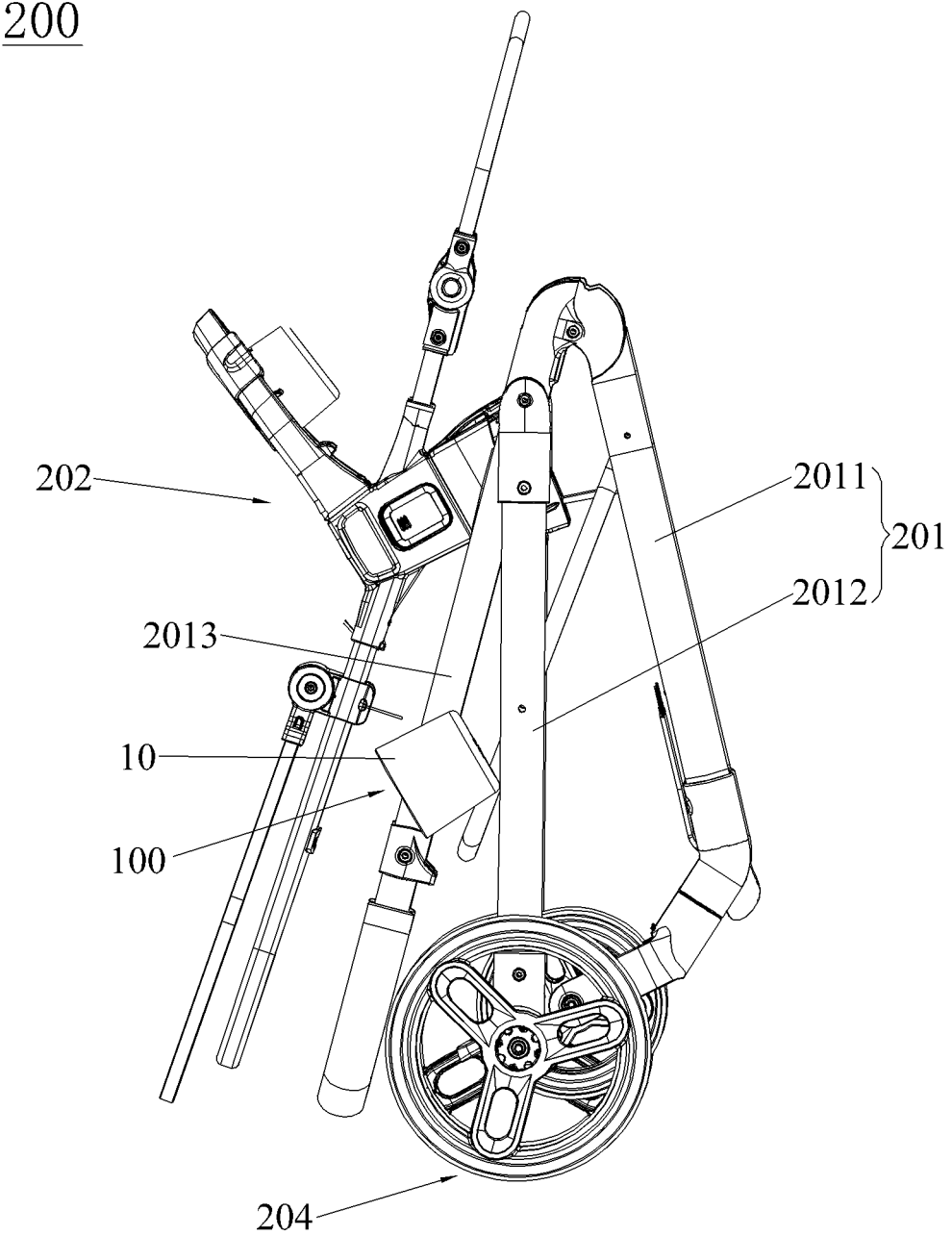
FIG. 6 is a diagram of the storage assembly pushed by a rear leg during folding operation of a frame of the present application.
Figure 7:
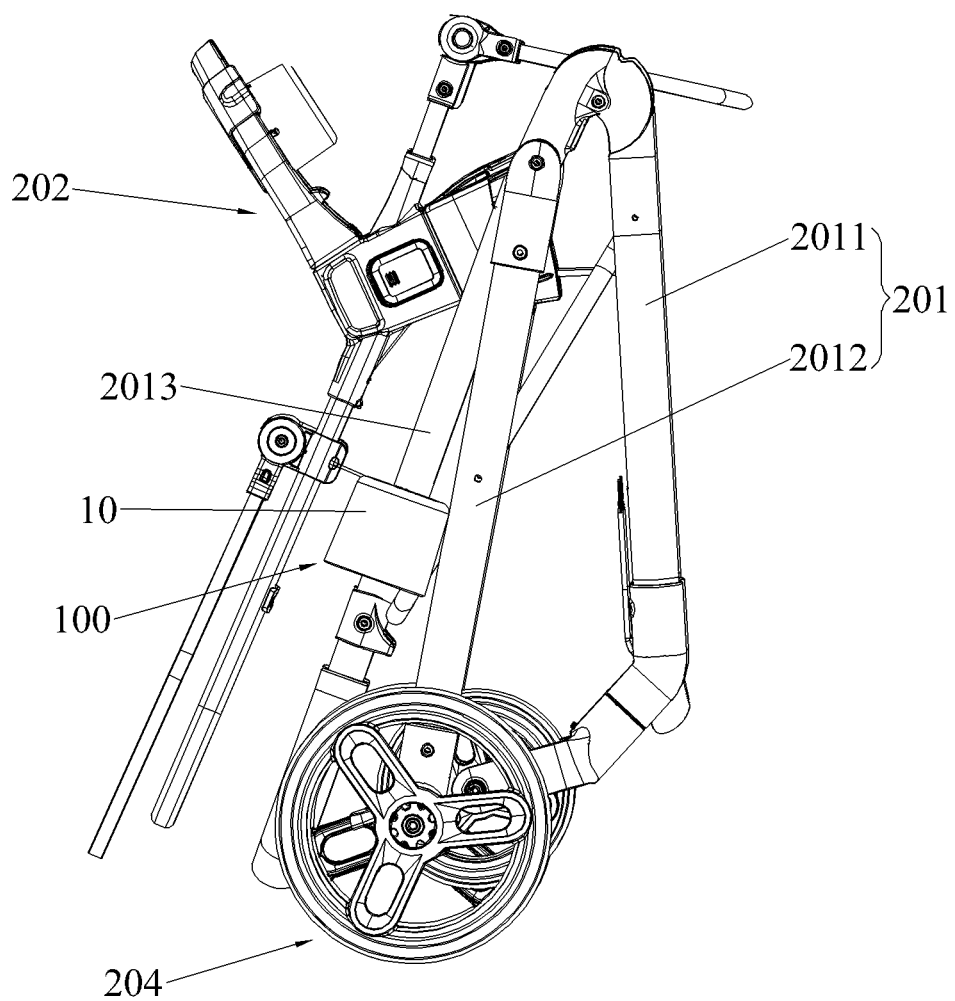
FIG. 7 is a diagram of the storage assembly in a folding state as the frame is folded of the present application.

Please refer to FIG. 6 and FIG. 7. FIG. 6 is a diagram of the storage assembly 100 pushed by the rear leg 2012 during folding operation of the frame 201 of the present application. FIG. 7 is a diagram of the storage assembly 100 in a folding state as the frame 201 is folded of the present application. Practically, a user can directly push the storage component 10 to rotate relative to the fixing base 20 to avoid interference, thereby facilitating the folding operation of the frame 201 and making the folded child carrier 200 more compact. In addition, it is also possible that during the folding or unfolding operation of the frame 201, the rotating rear leg 2012 can push against the storage component 10, so that the storage component 10 pivots relative to the fixing base 20 on the handle 2013 to avoid interference, which is more convenient in operation. As shown in FIG. 6, when folding the frame 201, the rear leg 2012 starts to push against the storage assembly 100. As shown in FIG. 7, the storage component 10 of the storage assembly 100 rotates relative to the handle 2013 by the pushing force provided by the rear leg 2012, so that the rear leg 2012 is closer to the handle 2013, which makes the occupied volume of the folded child carrier 100 smaller.

Figure 8:
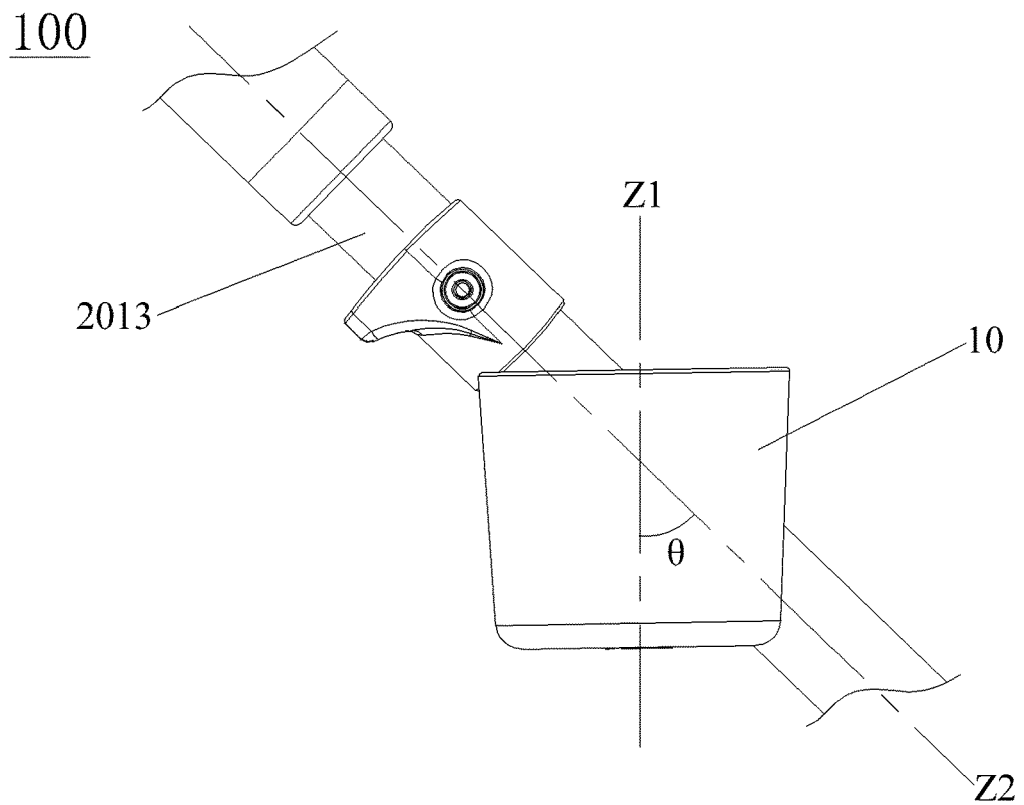
FIG. 8 is a diagram of the storage assembly in a using state of the present application.

Please refer to FIG. 8. FIG. 8 is a diagram of the storage assembly 100 in a using state of the present application. The storage component 10 pivots between a using state and a folding state with rotation of the storage component 10 relative to the handle 2013 within a predetermined angular range. The storage component 10 is at the using state when axes of the storage component 10 and the handle 2013 are intersected to form an included angle θ, and the storage component 10 is at the folding state when the axes of the storage component 10 and the handle 2013 are parallel with each other. The included angle θ can be 20°, 30°, 45° or 60°, etc. The included angle θ can be preferably 45° for better storage function of the storage component 10.

Specifically, when the storage component 10 is in the using state wherein a central axis Z1 of the storage component 10 and a central axis Z2 of the handle 2013 are intersected to form the included angle θ equal to 45°, the frame 201 is in the completely opened and using state, and the storage component 10 is substantially disposed on the handle 2013 vertically, which is convenient for picking, placing and storing small objects, as shown in FIG. 1 and FIG. 8. When the storage component 10 is in the folding state wherein the central axis Z1 of the storage component 10 and the central axis Z2 of the handle 2013 are parallel with each other, the frame 201 is in the completely folding state, and the storage component 10 is inclined by the folding frame 201, as shown in FIG. 7. When the child carrier 100 is opened, the rear leg 2012 and the handle 2013 leave away from each other to release the pushing force applied on the storage component 10, and then the storage component 10 can automatically return to the using state by gravity of the storage component 10.

Figure 9:
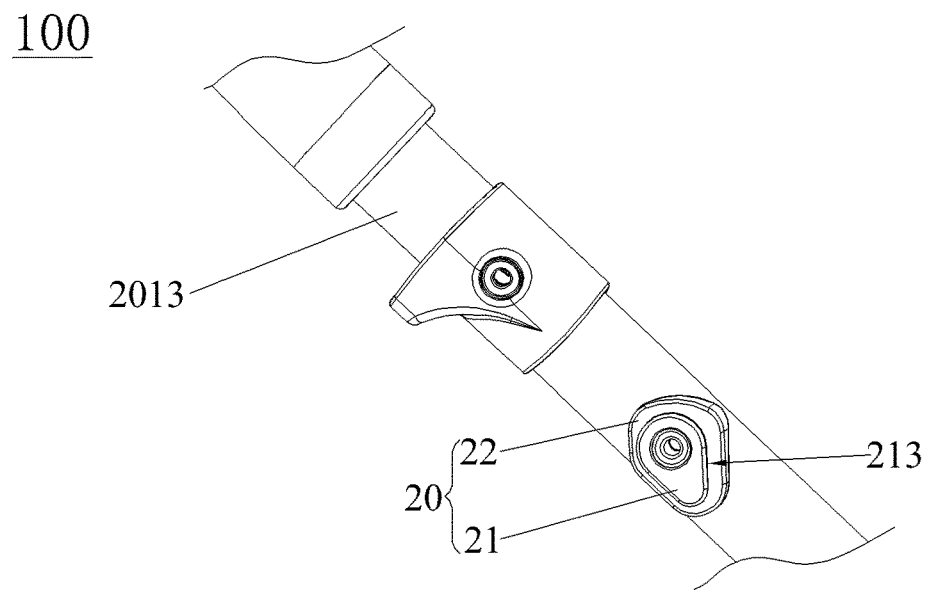
FIG. 9 is a diagram of the fixing base on the handle of the present application.

Please refer to FIG. 9. FIG. 9 is a diagram of the fixing base 20 on the handle 2013 of the present application. In order to achieve the configuration that the central axis Z1 of the storage component 10 and the central axis Z2 of the handle 2013 are intersected to form the included angle θ equal to 45° when the storage component 10 is in the using state, the fixing base 20 can be installed on the handle 2013 by the configuration that an included angle 45° is formed between a right end 213 of the engaging portion 21 and the central axis of the handle 2013.

In contrast to prior art, the storage assembly 100 of the present application includes the storage component 10, the fixing base 20, and the connecting component 30 rotatably connected to the fixing base 20. One of the fixing base 20 and the connecting component 30 is fixedly connected to the handle 2013 of the frame 201, and the other of the fixing base 20 and the connecting component 30 is fixedly to the storage component 10. The storage assembly 100 has simple structure, and the storage component 10 can be assembled on or disassembled from the handle 2013 through the fixing base 20 and the connecting component 30, which is convenient for installation. The storage component 10 can rotate relative to the handle 2013 by relative rotation between the connecting component 30 and the fixing base 20, so as to effectively avoid interference with the folding operation of the frame 201 due to the storage component 10 when folding the frame 201, and further facilitate the folding operation of the frame 201, so that the child carrier 200 can be folded to ideal volume for easy carrying and storage, which enhances convenience of using the child carrier 200 with the storage assembly 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage assembly installed on a frame of a child carrier,
   the storage assembly comprising:
   a storage component;
   a fixing base, the storage component pivoting relative to the fixing base when folding or unfolding the frame; and
   a connecting component rotatably connected to the fixing base, one of the fixing base and the connecting component being fixedly connected to a handle of the frame, and the other of the fixing base and the connecting component being fixedly to the storage component;
   wherein an engaging portion is formed on one of the fixing base and the connecting component, a connecting portion is formed on the other of the fixing base and the connecting component for slidably engaging with the engaging portion, and a distance between an edge of an upper arc part of the engaging portion and a rotary axis of the engaging portion is smaller than a distance between an edge of a lower protruding part of the engaging portion and the rotary axis of the engaging portion, so as to restrain relative rotation between the fixing base and the connecting component within a predetermined range defined by two lateral sides of the lower protruding part of the engaging portion.

2. The storage assembly of claim 1, wherein the fixing base is fixedly connected to the handle of the frame, an end of the connecting component is connected to the storage component, and another end of the connecting component is detachably pivoted to the fixing base.

3. The storage assembly of claim 1, wherein the storage component pivots between a using state and a folding state, the storage component is at the using state when axes of the storage component and the handle are intersected to form an included angle, and the storage component is at the folding state when the axes of the storage component and the handle are parallel with each other.

4. The storage assembly of claim 3, wherein the included angle is 45°.

5. The storage assembly of claim 1, wherein the connecting component and the fixing base are slidably connected, an upper end of the connecting component contacts against an upper end of the fixing base, and a lower end of the connecting component does not contact against or does not completely contact against a lower end of the fixing base.

6. The storage assembly of claim 1, wherein upper and lower ends of the connecting portion and an upper end of the engaging portion have equal widths.

7. The storage assembly of claim 1, wherein the engaging portion and the connecting portion are sleeved with each other.

8. The storage assembly of claim 1, wherein the connecting portion is sleeved on the engaging portion along a direction from the upper arc part of the engaging portion toward the lower protruding part of the engaging portion.

9. The storage assembly of claim 1, wherein the connecting portion is sleeved on the engaging portion along a direction perpendicular to the engaging portion.

10. The storage assembly of claim 1, wherein the engaging portion is disposed on the fixing base along a longitudinal direction of the fixing base, the connecting portion is disposed on the connecting component along a longitudinal direction of the connecting component, and an upper end of the connection portion is formed in an arc shape.

11. The storage assembly of claim 1, wherein the fixing base comprises a base, and the engaging portion protrudes from the base and is formed in a boss structure.

12. The storage assembly of claim 1, wherein the connecting component comprises a bottom wall and a U-shaped lateral wall extending from an edge of the bottom wall in a direction away from the bottom wall, and a slot-shaped connecting portion is enclosed by the bottom wall and the U-shaped lateral wall.

13. The storage assembly of claim 12, wherein a guiding slot is formed on the connecting component, and a top end of the U-shaped lateral wall is bent inwardly along a direction parallel to the bottom wall so as to form a U-shaped top wall with the guiding slot.

14. The storage assembly of claim 13, wherein the connecting component further comprises at least one positioning protrusion extending from a lateral side of the U-shaped top wall toward the guiding slot.

15. The storage assembly of claim 12, wherein the connecting component further comprises at least one protruding rib disposed on the bottom wall and arranged along a longitudinal direction of the bottom wall, and the at least one protruding rib is formed in an arc shape and configured to contact against the engaging portion.

16. A child carrier comprising:
   a frame comprising a front leg, a rear leg, and a handle pivotally connected to the front leg and the rear leg;
   a seat body connected to the frame;
   a front wheel assembly connected to the front leg;
   a rear wheel assembly connected to the rear leg; and
   a storage assembly rotatably installed on the handle, the storage assembly comprising:
      a storage component;
      a fixing base, the storage component pivoting relative to the fixing base when folding or unfolding the frame; and
      a connecting component rotatably connected to the fixing base, one of the fixing base and the connecting component being fixedly connected to a handle of the frame, and the other of the fixing base and the connecting component being fixedly to the storage component;
   wherein an engaging portion is formed on one of the fixing base and the connecting component, a connecting portion is formed on the other of the fixing base and the connecting component for slidably engaging with the engaging portion, and a distance between an edge of an upper arc part of the engaging portion and a rotary axis of the engaging portion is smaller than a distance between an edge of a lower protruding part of the engaging portion and the rotary axis of the engaging portion, so as to restrain achieve relative rotation between the fixing base and the connecting component within a predetermined range defined by two lateral sides of the lower protruding part of the engaging portion.

17. The child carrier of claim 16, wherein the fixing base is fixedly connected to the handle of the frame, an end of the connecting component is connected to the storage component, and another end of the connecting component is detachably pivoted to the fixing base.

18. The child carrier of claim 16, wherein the storage component pivots between a using state and a folding state, the storage component is at the using state when axes of the storage component and the handle are intersected to form an included angle, and the storage component is at the folding state when the axes of the storage component and the handle are parallel with each other.

\* \* \* \* \*